A. W. THOMAS.
CORN CUTTER KNIFE.
APPLICATION FILED JUNE 30, 1908.

917,976.

Patented Apr. 13, 1909.

Witnesses
W. H. Rockwell
R. N. Flint

Inventor
Albion W. Thomas.
By A. P. Greeley
Attorney

UNITED STATES PATENT OFFICE.

ALBION W. THOMAS, OF ROME, NEW YORK, ASSIGNOR TO THE BURT OLNEY CANNING COMPANY, OF ONEIDA, NEW YORK, A CORPORATION OF NEW YORK.

CORN-CUTTER KNIFE.

No. 917,976.          Specification of Letters Patent.          Patented April 13, 1909.

Application filed June 30, 1908. Serial No. 441,076.

*To all whom it may concern:*

Be it known that I, ALBION W. THOMAS, a citizen of the United States, residing at Rome, in the county of Oneida, State of New York, have invented certain new and useful Improvements in Corn-Cutter Knives, of which the following is a description, reference being had to the accompanying drawings, forming a part hereof.

My invention relates to knives for cutting or slitting the kernels of ears of green corn so that the nutritious portion or pulp of the corn may be extracted therefrom leaving the hulls or skins adhering to the cob; and the object thereof is to provide a knife in which the liability to clog when in use will be reduced to a minimum, which will be simple in construction, and effective for the purpose for which it is designed.

My improved corn cutter knife as disclosed in this application is of the same general type as the corn cutter knife for which Letters Patent No. 894,804 was granted to me upon July 28, 1908, and is designed for use in a machine wherein ears of green corn are fed along in the direction of their length, so that a properly adjusted knife will cut open the outer ends of a row of kernels as the ear passes along. A plurality of knives, usually four, are used in a given machine, and they are disposed so as to surround the ear; from which it will be appreciated, bearing in mind the curved form of support hereinafter disclosed whereby the separate cutting members or blades are supported, that all of the longitudinal rows of kernels upon the ear will be cut open as it passes through the machine.

In view of the fact that my invention relates solely to a knife designed for use with corn cutting machines of common and well known form I have deemed it unnecessary to illustrate such a machine in its entirety, and have confined my description and drawing wholly to the improved knife member wherein my invention resides.

Figure 1:
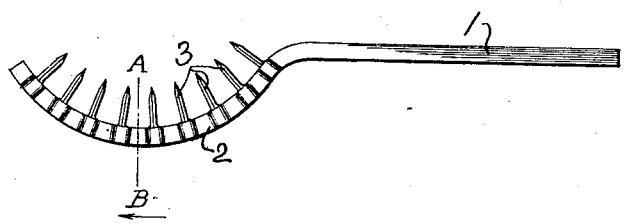
Figure 2:
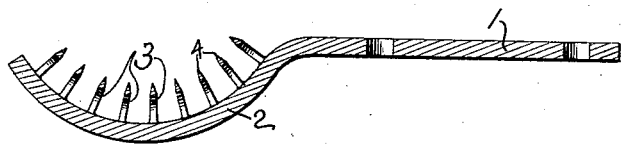
Figure 3:
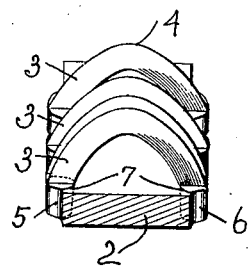

In the accompanying drawing, Figure 1 is a side elevation of my improved corn cutter knife, Fig. 2 is a sectional view taken upon a plane at right angles to the line of travel of the corn to be cut, and, Fig. 3 is a sectional view taken upon a plane at right angles to the plane of Figs. 1 and 2 and intersecting the same along the line A—B Fig. 1 looking in the direction of the arrow.

My improved corn cutter knife comprises a knife arm made up of a portion 1 by means of which the knife is to be secured in the machine with which it is to be used, and which portion while shown as straight will be of such form as to adapt it to the particular machine with which the knife is to be used; together with a curved portion 2 to which the cutting members or blades of my improved knife are secured and by which they are supported.

The curved portion 2 of my knife conforms substantially to the average ear of corn to be cut, and the length thereof is about one fourth the circumference of such an ear, so that four of my knives will completely surround the ear and present a sufficient number of cutting blades thereto to cut or slit all of the longitudinal rows of kernels upon the ear.

The curved portion 2 of the knife arm is provided with a plurality of cutting members or blades 3, which blades are disposed in planes substantially radial with reference to the curved portion 2 of the knife arm and project therefrom into the path of the ear of corn as it passes through the machine, it being understood that the movement of the ear is at right angles to the plane of Fig. 1.

The blades 3 are triangular in form and are sharpened to form a convex cutting edge at 4. They are preferably made from pieces of wire or rod and are of considerable length as compared with their diameter, and are when finished and in place of arched or curved form as shown in Fig. 2. The two ends of a blade are secured to the opposite edges of the curved portion of the knife arm as shown at 5 and 6, and the intermediate portion thereof extends across but is not attached to or in contact with said arm, an open space beneath said arm and between it and the blade being thus secured as will be understood from Figs. 2 and 3, and in order to more firmly secure the blades to their support, recesses 7 are formed in either side of the curved portion 2 of the knife arm, into which recesses the ends of the blades are secured as by solder or by brazing.

By this construction it will be seen that the separate cutting members or blades are secured to their support at their extreme ends only, and that they are entirely free and disposed at a distance from said support along their intermediate or middle portion;

and that a knife is thereby procured in which there are no channels of considerable length and with unyielding walls extending parallel with the direction of travel of the ear of corn, in which channels particles of corn might be retained and the knife thus become clogged. The extent of each of the cutting blades at the points where it joins the knife arm is therefore in my knife reduced to twice the maximum diameter of the cutting member or blade, whereas in former knives designed for a like purpose the cutting blade has commonly been secured to its support along a base of considerable length. This feature, whereby long narrow channels extending across the knife and having unyielding sides are avoided, has been found in practice to produce a knife in which there is little or no tendency to clog, and one which in actual use has been found to work freely with a minimum of trouble because of clogging of the knives.

Having thus described my invention and explained the mode of operation thereof, I claim and desire to secure by Letters Patent:—

1. A corn cutter knife comprising a knife arm, a portion thereof being curved to conform to the corn to be cut; and a plurality of blades carried by said knife arm, each of said blades being secured to said knife arm at its ends only, and having its intermediate portion extending across said arm and disposed at a distance therefrom to thereby leave an open space between said blade and said arm.

2. A corn cutter knife comprising a knife arm, a portion thereof being curved to conform to the corn to be cut; and a plurality of blades carried by said knife arm and disposed in planes radial with reference to the curved portion of said knife arm, each of said blades being secured to said knife arm at its ends only, and having its intermediate portion extending across said arm and disposed at a distance therefrom to thereby leave an open space between said blade and said arm.

3. A corn cutter knife comprising a knife arm a portion thereof being curved to conform to the corn to be cut; a series of recesses formed in each side of said arm; and a plurality of blades carried by said knife arm, the ends of said blades being secured in said recesses, and the intermediate portion of said blades extending across said arm and being disposed at a distance therefrom to thereby leave an open space between said blade and said arm.

This specification signed and witnessed this 25 day of June A. D. 1908.

ALBION W. THOMAS.

In the presence of—
 FLOYD D. POTTER,
 M. B. HALL.